May 4, 1926.
J. H. ROETHEL
1,583,315
AUTOMATIC AUTOMOBILE SHUTTER AND LOCK
Filed Jan. 21, 1925    2 Sheets-Sheet 1
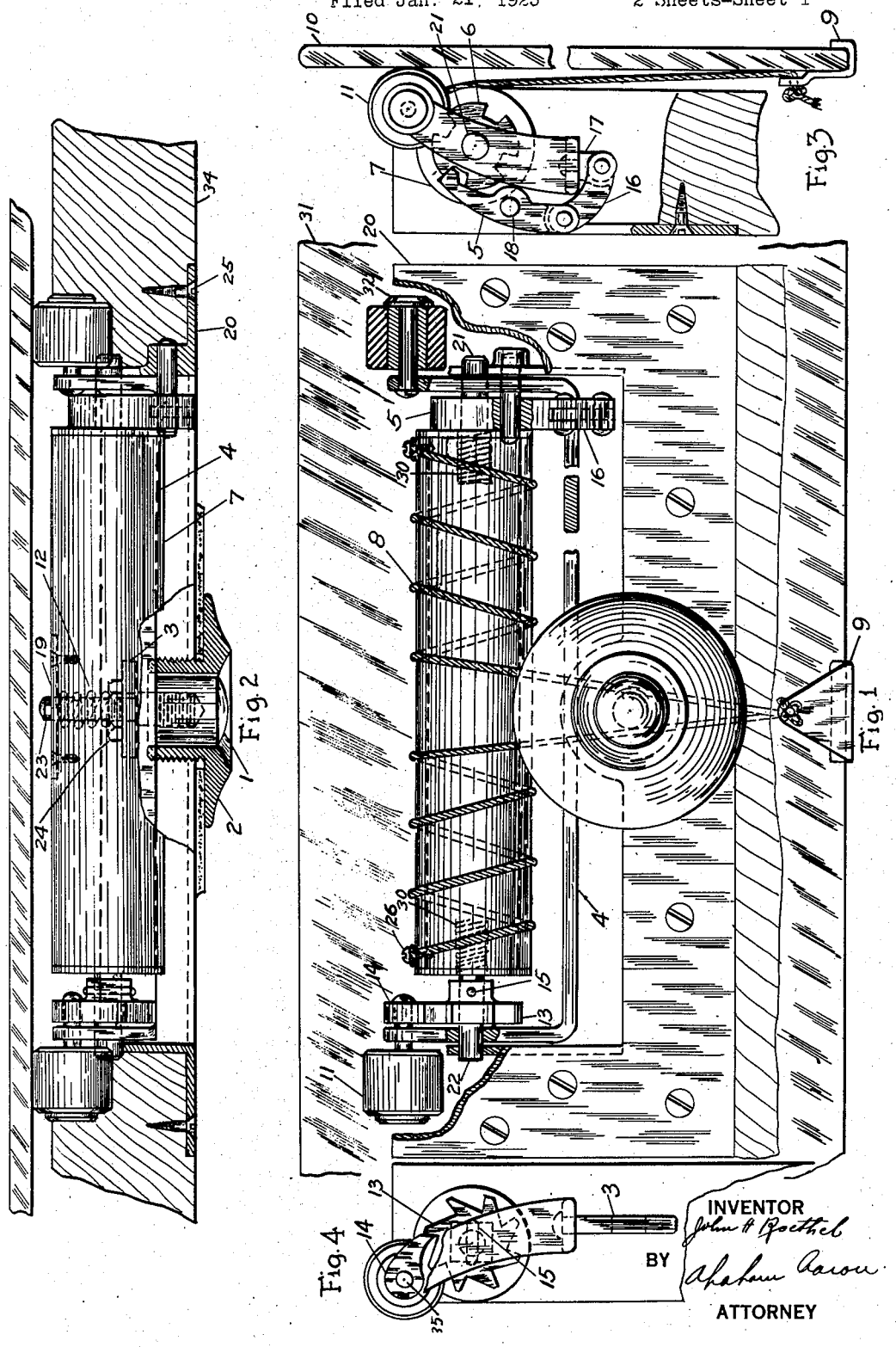
INVENTOR
John H. Roethel
BY
Abraham Aaron
ATTORNEY May 4, 1926.  1,583,315
J. H. ROETHEL
AUTOMATIC AUTOMOBILE SHUTTER AND LOCK
Filed Jan. 21, 1925  2 Sheets-Sheet 2
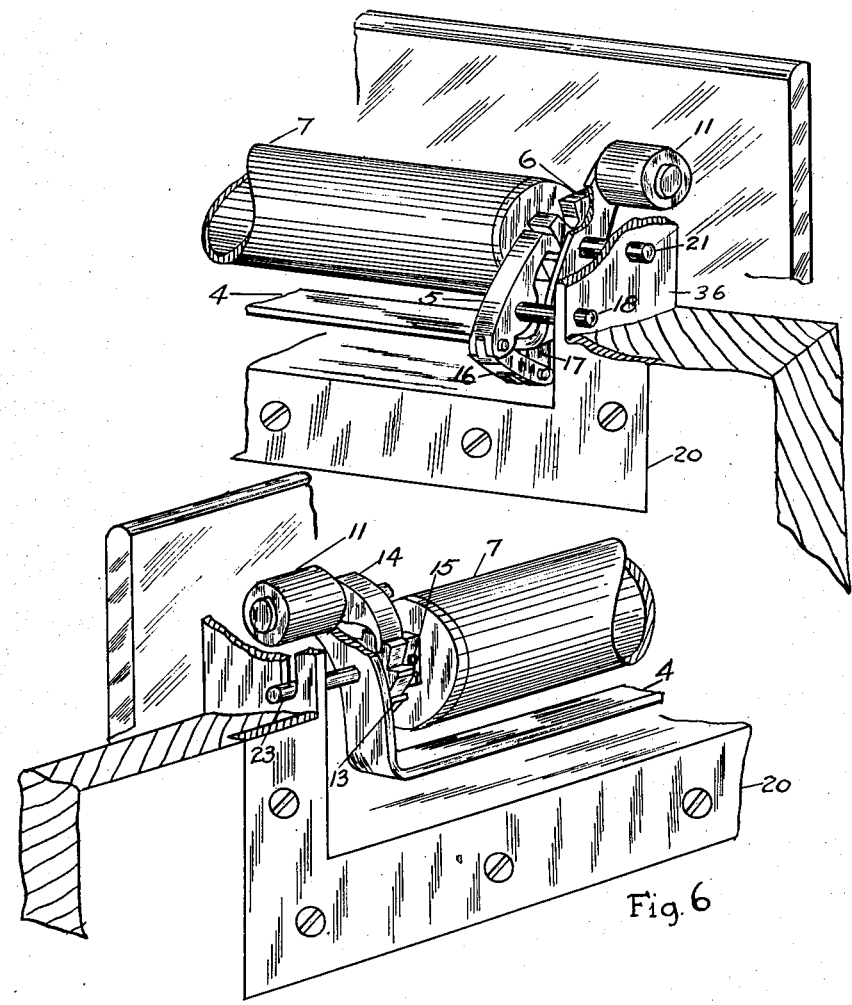
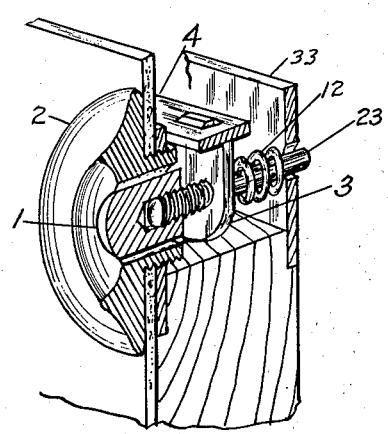
INVENTOR
John H. Roethel
BY
Abraham Aaron
ATTORNEY Patented May 4, 1926.

1,583,315

UNITED STATES PATENT OFFICE.

JOHN H. ROETHEL, OF BROOKLYN, NEW YORK.

AUTOMATIC AUTOMOBILE SHUTTER AND LOCK.

Application filed January 21, 1925. Serial No. 3,826.

*To all whom it may concern:*

Be it known that I, JOHN H. ROETHEL, a citizen of the United States, and a resident of the borough of Brooklyn, county of Kings, city and State of New York (whose post-office address is No. 661 Bushwick Avenue, borough of Brooklyn, New York city), have invented a certain new and useful Improvement on an Automatic Automobile Shutter and Lock, of which the following is such a full, clear, and exact description as will enable anyone skilled in the art to which it appertains to make and use the same, reference being had to the accompanying drawing, which forms a part of this application.

In the ordinary use of automobile windows where the glass can be raised or lowered by means of a winding apparatus, said method being cumbersome, I have invented an attachment that can be placed in any automobile window whereby the glass may be raised or lowered by means of a push button, which is done instantaneously and simply.

My invention can be attached to any window of an automobile door to raise the glass by means of a push button. The window or glass is locked automatically when the push button is released. Rubber rollers are provided to prevent the glass from rattling. The glass is raised by means of a spring roller to which is attached a cord fastened to the bottom edge of the glass. The glass is lowered by the force of gravity.

I attain these objects by the mechanism illustrated in the accompanying drawings, in which:

Figure 1 is a front view of the device;

Figure 2 a plan view of the device;

Figure 3, a right end view;

Figure 4, a left-end view;

Figure 5 (Sheet 2) an assembled perspective view of the right-end of the device;

Figure 6 an assembled left-end perspective view;

Figure 7, a vertical section in perspective of the mechanism attached to the push button.

Similar numerals refer to similar parts throughout the several views. Referring more specifically to the drawing, on Sheet 1 is shown a push button 1 fitted into an escutcheon 2, which is in turn screwed into the metal plate 20. The button is screwed into a pin 23 attached to part supporting bracket 3. Part 3 is riveted to roller frame 4, which is a strip extending the full width of the opening in the door. On the right end of roller frame 4 is attached a four toothed ratchet 6, which provides the locking feature of the device by means of pawl 5. When the button 1 is pushed roller frame 4 is moved to the right when looking at Figure 3. When part roller frame 4 moves to the right it draws the pawl 5 out of the tooth in the ratchet thus enabling the spring 30 in the roller to revolve which in turn winds up the cord 8 which draws up the glass 31. The pawl 5 is pivoted on pin 18. Link 16 connects roller frame 4 to the pawl 5. Axle 21 passes through part roller frame 4 and enters a hole in the plate 20. A rubber roller 11 is attached to part roller frame 4 by means of a pin 32, riveted or bolted at both ends to roller frame 4 and holds rubber roller 11 in position. The ratchet 6 is fixed on the right end of the roller 7. Roller frame 4 is forced into an upright position again by the return spring 12 when the button is released. The return spring 12 is held in place by a plate 33 screwed into the frame of the door 34. The spring 30 inside of the roller 7 is wound by means of a ratchet 13 located at the left end of the roller (see Fig. 4). The ratchet 13 is prevented from revolving by pawl 14 which is pivoted on a pin 35 riveted on part roller frame 4. A rubber roller 11 is also provided at this end to prevent the glass from rattling. The escutcheon 2 is screwed into the plate 20 and the threads are of sufficient number to provide for varying thicknesses of upholstery, or frame. The cord 8 on the roller is attached to the bottom of the glass 31 by means of a clip 9 bent to fit the thickness of the glass snugly. The cord is fastened to the roller by means of screws 26. The left ratchet 13 is pinned to the shaft or axle 22 by the dowel 15. Part 22, the shaft, slips in a slot cut in the plate 20. A nut 24 is screwed on the pin 23 to hold the pin on supporting bracket 3. Roller frame is held in place by means of screws 25 screwed into the wooden frame of the door. Pin 18 is driven into a plate 20 soldered to the roller frame 4.

The applicant herein does not intend to limit himself to the invention as herein described, but may make such changes as may be necessary, without departing from the broad scope of this invention.

I claim:—

1. A window lifting device comprising a roller, a window pane slidably cooperating with said roller, spring operated means adapted to rotate said roller in one direction, cords connecting said pane and roller, axles suporting said roller at the ends thereof, a ratchet fixedly mounted on said axle, a frame pivoted on said axle, an articulated pawl pivoted adjacent said frame normally engaging said ratchet, and a link connecting the lower end of said pawl with said frame, said frame when moved inwardly being adapted to rotate the pawl out of engagement with the ratchet to permit lowering of the window.

2. A window lifting device comprising a roller, a window pane slidably cooperating with said roller, spring operated means adapted to rotate said roller, cords connecting said pane and roller, axles supporting said roller at the ends thereof, a ratchet fixedly mounted on said axle, a frame pivoted on said axle, an articulated pawl pivoted adjacent said frame normally engaging said ratchet, and a link connecting the lower end of said pawl with said frame, said frame when moved inwardly being adapted to rotate the pawl out of engagement with the ratchet to permit lowering of the window, rollers mounted on the ends of said frame, the peripheries thereof engaging the surface of the window to prevent jarring thereof.

3. A window lifting device comprising a roller, a window pane slidably cooperating with said roller, spring operated means adapted to rotate said roller, cords connecting said pane and roller, axles supporting said roller at the ends thereof, a ratchet fixedly mounted on said axle, a frame pivoted on said axle, an articulated pawl pivoted adjacent said frame normally engaging said ratchet, and a link connecting the lower end of said pawl with said frame, said frame when moved inwardly being adapted to rotate the pawl out of engagement with the ratchet to permit lowering of the window, rollers mounted on the ends of said frame, the peripheries thereof engaging the surface of the window to prevent jarring thereof, said frame when moved being adapted to shift the rollers thereon out of contact with the window, and means for actuating said frame when disengaging the pawl from the ratchet and shifting said rollers.

4. In a window, a window lifting and lowering device comprising in combination a window frame, a window pane guided vertically in said frame, a roller mounted on said frame, axles supporting said roller, rubber rollers adapted to contact with said window when the latter is being lifted, and a floating frame mounted on said axles and supporting said rubber rollers and when rotated being adapted to move said rubber rollers out of contact with the window, and means for actuating said supporting frame.

5. In a window, a window lifting and lowering device comprising in combination a window frame, a window pane guided vertically in said frame, a roller mounted on said frame, axles supporting said roller, rubber rollers adapted to contact with said window when the latter is being lifted, and a floating frame mounted on said axles and supporting said rubber rollers and when rotated being adapted to move said rubber rollers out of contact with the window, means for actuating said supporting frame comprising a pin anchored to said frame and projecting therefrom, a push button threadably engaging said pin and projecting from the window frame, said push button when depressed being adapted to move the frame to disengage the rubber rollers from contact with the window, and means for normally moving the frame to cause contact of the rubber rollers with the window.

6. In a window, a window lifting and lowering device comprising in combination a window frame, a window pane guided vertically in said frame, a roller mounted on said frame, axles supporting said roller, rubber rollers adapted to contact with said window when the the latter is being lifted, and a floating frame mounted on said axles and supporting said rubber rollers and when rotated being adapted to move said rubber rollers out of contact with the window, means for actuating said supporting frame comprising a pin anchored to said frame and projecting therefrom, a push button threadedly engaging said pin and projecting from the window frame, said push button when depressed being adapted to move the frame to disengage the rubber rollers from contact with the window, a spring mounted on said pin behind said frame, said pin being adapted to be retained between a ratchet element and the frame to cause the latter to be moved transversely for urging the rubber rollers into contact with the window.

7. In a window, a window lifting and lowering device comprising in combination a window frame, a window pane guided vertically in said frame, a roller mounted intermediate the height of said frame, axles supporting said roller, rubber rollers adapted to contact with said window when the latter is being lifted, and a floating frame mounted on said axles and supporting said rubber rollers and when rotated being adapted to move said rubber rollers out of contact with the window, means for actuating said supporting frame comprising a pin anchored to said frame and projecting therefrom, a push button threadably engaging said pin and projecting from the window frame, said push button when depressed being adapted to move the frame to disengage the rubber rollers from contact with the window, a spring mounted on said pin behind said frame, said pin being adapted to be retained between a ratchet element and the frame to cause the latter to be moved transversely for urging the rubber rollers into contact with the window, and an escutcheon cap threadably mounted on the window frame, said push button being slidable in said escutcheon cap.

JOHN H. ROETHEL.